United States Patent [19]

Blome

[11] Patent Number: 4,929,294

[45] Date of Patent: May 29, 1990

[54] METHOD OF CREATING PROFILING PROJECTIONS ON PLASTIC-COVERED STEEL PARTS

[75] Inventor: Peter Blome, Herne, Fed. Rep. of Germany

[73] Assignee: Blome GmbH & Co. Kommanditgesellschaft, and Strabag Bau-Aktiengesellschaft, Fed. Rep. of Germany

[21] Appl. No.: 86,101

[22] Filed: Aug. 14, 1987

[30] Foreign Application Priority Data

Aug. 23, 1986 [DE] Fed. Rep. of Germany ....... 3628704
Apr. 4, 1987 [DE] Fed. Rep. of Germany ....... 3711420

[51] Int. Cl.$^5$ .................... B05D 1/06; B05D 3/02; B05D 5/00; B32B 3/00

[52] U.S. Cl. ................... 156/187; 156/244.13; 156/244.15; 264/24; 264/35; 264/131; 264/135; 264/173; 264/262; 264/274; 427/29; 427/202; 427/261; 427/318; 427/386; 427/388.1; 427/409; 427/410

[58] Field of Search ............ 264/24, 35, 131, 134, 264/135, 173, 262, 274, 279, 279.1; 427/27, 29, 202, 261, 318, 386, 388.1, 409, 410; 156/187, 188, 244.13, 244.15; 138/114, 144, 145, 146

[56] References Cited

U.S. PATENT DOCUMENTS

| | | | |
|---|---|---|---|
| 1,797,443 | 3/1931 | Powell | 264/274 X |
| 3,904,346 | 9/1975 | Shaw et al. | 427/29 |
| 3,944,641 | 3/1976 | Lemelson | 264/173 X |
| 4,211,595 | 7/1980 | Samour | 156/187 |
| 4,213,486 | 7/1980 | Samour et al. | 156/187 X |
| 4,451,413 | 5/1984 | Stucke et al. | 264/173 X |
| 4,510,007 | 4/1985 | Stucke | 264/173 X |
| 4,519,863 | 5/1985 | Landgraf et al. | 264/173 X |
| 4,560,607 | 12/1985 | Sumner | 264/274 X |
| 4,752,497 | 6/1988 | McConkey et al. | 427/29 |

FOREIGN PATENT DOCUMENTS

| | | | |
|---|---|---|---|
| 137663 | 4/1985 | European Pat. Off. | |
| 1261431 | 2/1968 | Fed. Rep. of Germany | 427/410 |
| 2127732 | 12/1972 | Fed. Rep. of Germany | |
| 2952540 | 7/1981 | Fed. Rep. of Germany | 264/262 |
| 3326701 | 2/1985 | Fed. Rep. of Germany | |
| 3503984 | 9/1985 | Fed. Rep. of Germany | 264/131 |
| 3512528 | 10/1986 | Fed. Rep. of Germany | |
| 3531618 | 3/1987 | Fed. Rep. of Germany | |
| 41-16193 | 9/1966 | Japan | 264/135 |
| 51-58595 | 5/1976 | Japan | 427/202 |
| 54-3699 | 2/1979 | Japan | 156/187 |
| 55-124622 | 9/1980 | Japan | 156/187 |
| 56-78933 | 6/1981 | Japan | 156/244.15 |
| 57-9870 | 2/1982 | Japan | 427/261 |
| 57-91231 | 6/1982 | Japan | 427/202 |
| 58-51130 | 3/1983 | Japan | 427/202 |
| 60-201927 | 10/1985 | Japan | 156/244.15 |
| 654421 | 4/1979 | U.S.S.R. | 427/29 |
| 874366 | 10/1981 | U.S.S.R. | 264/131 |
| 2137304 | 10/1984 | United Kingdom | |

OTHER PUBLICATIONS

Checkel, R. L., "Fluidized Polymer Deposition", Modern Plastics (Oct. 1958), pp. 125–132.

Primary Examiner—Jeffery Thurlow
Assistant Examiner—Leo B. Tentoni
Attorney, Agent, or Firm—Martin A. Farber

[57] ABSTRACT

A method of covering steel parts onto the outer surface of which there is applied a plastic coating which is surrounded by an embedding material. In order to obtain in a simple manner increased adherence between plastic coating and embedding material a granular powder or granulate is applied to the plastic coating which is still not completely hardened so that the individual powder granules are received only in part by the coating surface, so as to form profiling projections. In accordance with a variant, the profiling projections can also be formed by the side flanks of a helical rib which is extruded onto the heated plastic coating.

25 Claims, 6 Drawing Sheets

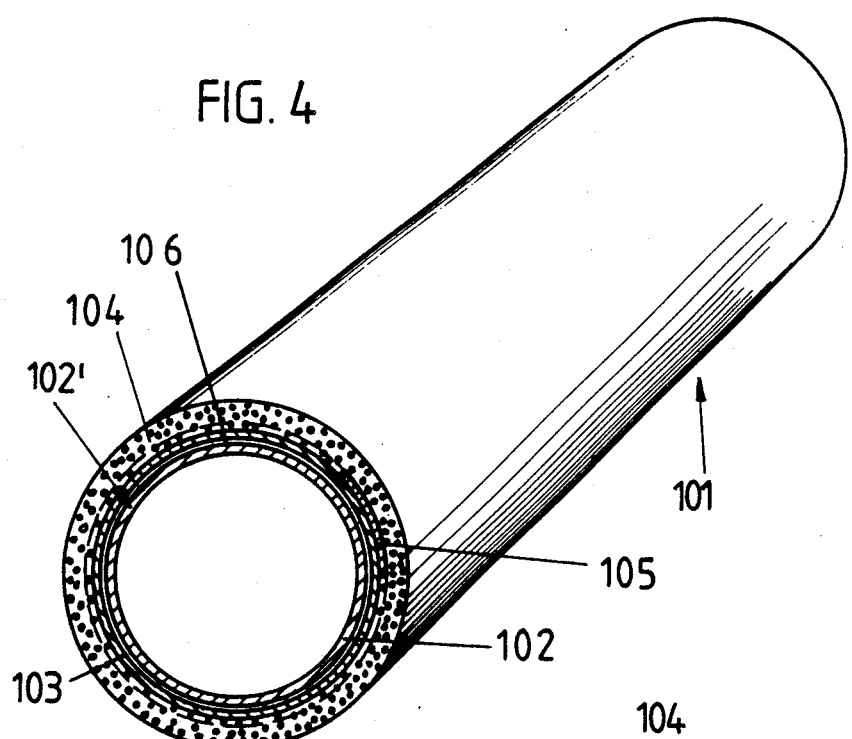
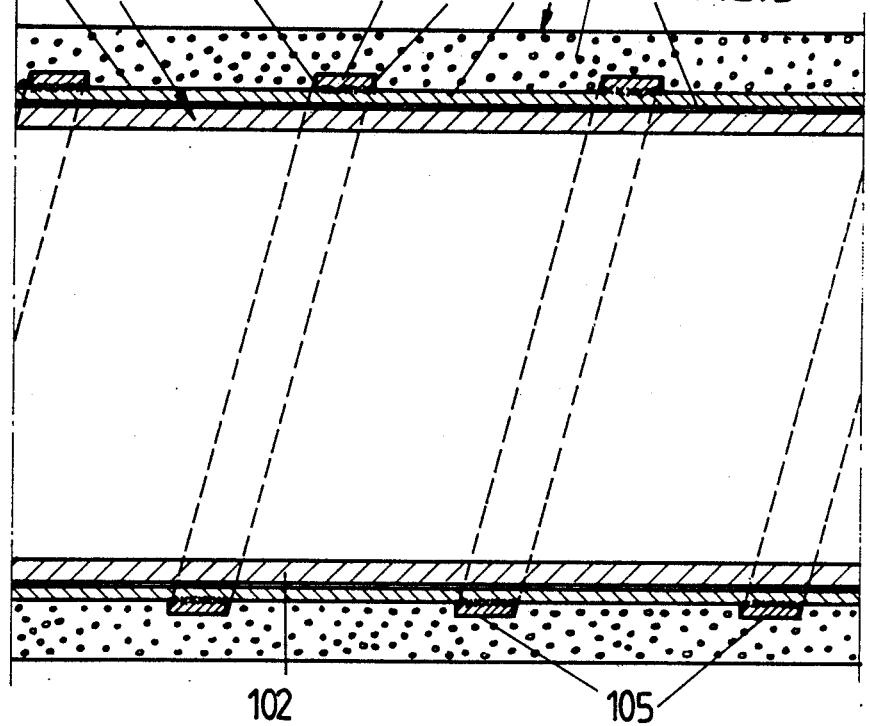

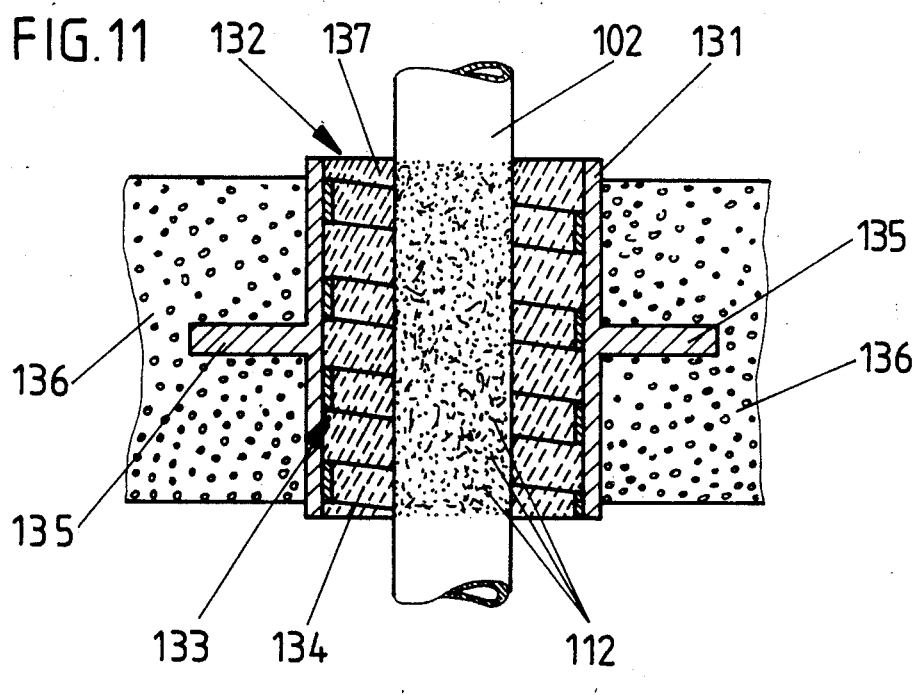
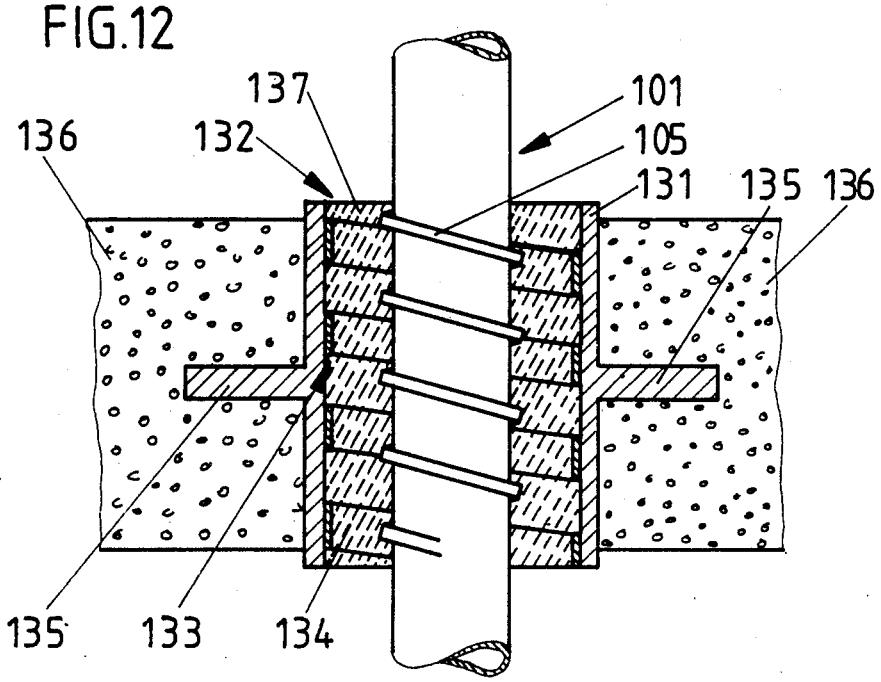

METHOD OF CREATING PROFILING PROJECTIONS ON PLASTIC-COVERED STEEL PARTS

BACKGROUND OF THE INVENTION

The present invention relates to a method of covering steel parts on the outer surface of which there is applied a plastic coating which is or can be brought in contact, at least in individual regions, with an embedding material, the interface formed by the outer surface of the plastic coating with the embedding material being provided with profiling projections.

One such method is known from Federal Republic of Germany OS 35 31 618. In that case a steel pipe is provided with a layer of thermoplastic resin over which an outer coating having a base of concrete is then applied. The plastic coating is produced by helical overlapping wrapping with an extruded foil tape which is provided with at least one thickening which extends in strip shape over the entire length of the foil tape. The thickening is arranged on that edge of the foil tape which is not overlapped by a following layer of the foil tape.

The concrete coating serves, in particular, to increase the weight of the pipes so as to counteract by additional weight, the hydrostatic buoyancy of empty offshore pipelines when they are being laid. Upon the laying of such pipelines, considerable tensile stresses occur which are transferred by the holding devices of the laying ships to the steel pipes via the covering. The strip-shaped thickenings of the foil tape which are embedded in the concrete coating serve to increase the adherence between the plastic covering and the concrete jacket.

SUMMARY OF THE INVENTION

The object of the present invention is to provide a method of the aforementioned type, as well as such a covered steel part, which leads in a particularly simple manner to increased adherence between plastic coating and embedding material. In particular no special extrusion nozzles are to be required in the case of thermoplastic resin coating.

This object is achieved in accordance with the invention in the manner that a granular powder or granulate is so applied to the plastic coating before it has completely hardened that only parts of the individual grains of powder are contained in the surface of the coating. Due to the still incomplete hardness of the plastic coating, the powder can penetrate only in part into the surface of the plastic coating; i.e., due to the partial embedment of the individual granules of the powder there is a portion of their surface which protrudes beyond the surface of the plastic coating. In this way a rough covering is created which, on the one hand, considerably enlarges the coating surface and, on the other hand, creates projections which, upon the embedding of the steel part, are surrounded by the embedding material, preferably concrete or an embedding material having a base of concrete. The adherence between this coated steel part and the embedding material is thus considerably increased.

The invention is thus advantageous for reinforcement bars as well as for the formation of a structural steel joint. In the case of a structural steel joint, which is not contained within an embedding material, two structural steel parts are fastened to each other under stress. The shear stresses which occur as a result hereof are transmitted to each other by surface friction of the two structural parts. By the rough covering of the invention the surface friction is considerably increased, which is advantageous for the transmission of force. Recourse need not be had to an anti-slide coating, as provided in the prior art.

The plastic coating furthermore protects the structural steel part from damage by corrosion. The plastic coating may consist of a thermoplast or else of an epoxy resin. In the case of coating with a thermoplast, for instance polyethylene, the steel structural part which is to be coated is heated and the plastic, for instance in the form of an extruded foil tape or foil tube, is applied to the heated surface. The development of the profiling projections as protruding powder or granulate particles leads, in simple fashion, to a very large abutment surface for the embedding material so that an extremely good adherence can be obtained between these parts.

According to another development of the invention, the powder applied is plastic powder. A rough covering is, however, formed also when using ceramic powder or powdered stone (for instance, sand). The use of metallic powder is also possible, in which case, however, the metallic powder must not penetrate to the surface of the steel since in such case the corrosion protection is jeopardized.

It may be advisable to use the same material for the plastic coating and the powder.

The method can be carried out in the manner that a thermoplastic layer, in particular a layer of polyethylene, is applied as plastic coating, this coating being in a gelating state as a result of a heat treatment upon the application of the powder.

For this, the residual heat which the steel part still possess directly after the plastic coating can be excellently used. If the powder is applied to the gelating coating film of the plastic coating then it penetrates in part into the surface of the coating film and becomes bonded to it. If, in accordance with a preferred embodiment of the invention, a thermoplastic powder, and in particular powdered polyethylene (10), is used as powder, it will be softened by the residual heat, in which connection, however, it will not be taken up entirely by the gelating coating film. By the softening or initial melting an intimate bond is formed with the rest of the plastic coating.

Polyethylene and/or ethylene copolymer is preferably used for the plastic coating and/or the powder.

In accordance with another embodiment of the invention as plastic coating there is applied a layer of thermosetting resin, in particular a layer of epoxy resin, which is still in a tacky condition since not yet completely hardened upon the application of the powder. In accordance with the invention thus the powder is applied prior to the hardening of the layer of plastic coating so that the individual particles of the powder bond in the course of a chemical reaction homogeneously to the layer of plastic and are held fast in this way. A thermosetting powder, and in particular an epoxy resin powder, is preferably used.

For a simple powder coating the powder can be blown onto the plastic coating. The application of the powder can, in such case, preferably be supported by an electrostatic field. As an alternative to blowing, the powder can also be strewn on, thrown on or applied by fluidization.

The powder can also be of relatively coarse size so that it represents a granulate which consists preferably of the said materials.

Furthermore, the invention concerns a method for the covering of steel parts, particularly pipes, on the outer surface of which there is applied a plastic coating which can be brought into or is in contact with at least one embedding material, the interface to the embedding material which is formed by the outer surface of the plastic coating being provided with profiling projections and the profiling projections being formed by the side flanks of a helical rib extruded onto the heated plastic coating.

If the steel structural part is an elongated object, for instance a pipeline, then the profiling projections form steps which are transverse to the longitudinal direction of the object. As a result of this development, there is obtained an attachment of high shear strength between the plastic covering and the embedding material, which may preferably be developed as a concrete covering. If such structural steel parts developed as pipes are laid in the sea, then the forces of longitudinal displacement which occur between the covering material and the pipe are taken up by the form lock created by the profiling projections.

As a result of the helical rib, steps arranged transversely to the longitudinal direction of the pipe are formed. The size of the steps is dependent on the diameter of the pipe or on the weight of the concrete covering and the steel pipe. In accordance with the invention, the plastic coating is first of all applied to the steel part and the helical rib is then extruded onto said coating. The plastic coating is preferably a layer of thermoplast so that the subsequent application of coating and helical rib leads to the advantage that no special extruder nozzles need be used, such as those known from the prior art (Federal Republic of Germany OS 35 31 618) which simultaneously produce the coating and the rib. Rather, in accordance with the invention, the coating is effected independently of the development of the rib so that—depending on the specific case of use—the proper shape or size of extruder nozzle for the rib can be selected independently of the extruder nozzle for the plastic coating. Thus the coating plant can very rapidly be adapted to the specific desired case of use by mere replacement of the helical-rib extruder nozzle.

Furthermore, directly after the application of the thermoplastic resin coating, the helical rib is applied to it, the outer side of the tape and/or the attachment side of the helical rib being acted on by a source of heat in order to maintain the melting temperature of the surface. The structural steel part while still hot after the application of the plastic coating is thus then immediately provided with a rib, which is very advantageous from an energy standpoint. In order to produce a firm bond between plastic coating and rib, the plastic coating and/or the attachment side of the rib should be maintained at the surface melting temperature. It is sufficient here if only a few $\mu m$ of the corresponding surface are maintained in slightly melted condition. An intimate melting together takes place at the point of contact.

In accordance with a further development of the invention, the plastic coating applied can be cooled until the helical rib is applied so as to increase the structural strength of the plastic coating. This has the advantage that the cooled plastic coating is able to take up forces so that the shrinkage stresses then exerted by the helical rib as a result of the cooling thereof can be taken up without damage. The renewed softening of the surface of the plastic coating which takes place upon the application of the rib is not disturbing since the melting-on takes place only within a depth of a few $\mu m$ which does not impair the structural strength obtained by the cooling in the rest of the region.

The invention also concerns a steel structural part provided with plastic coating which can be embedded or is embedded, at least in individual regions, in a coating material and in connection with which the interface with the embedding material which is formed by the outer surface of the plastic coating is provided with profiling projections. In this connection it is contemplated that the profiling projections (rough covering) of the plastic coating be formed of powder particles or granulate particles which protrude from the outer surface of the coating. The powder is preferably a plastic powder or plastic granulate. The same material can be used for both the plastic coating and the powder.

Furthermore an advantageous feature resides in the fact that a different hardness of the profiling projections and the plastic coating, particularly of the extruded tape, is provided. A particularly firm attachment to the embedding material can, in particular, be obtained if the profiling projections consist of the harder material.

The arrangement can be such that the embedding material is arranged fixed in position in order to hold fast the steel part, which is developed in particular as a pipe. In particular, the embedding material can be developed as an anchoring block which is fastened in the ground. In this way the possibility is established, for instance, in the case of a pipeline, of immovably fixing at specific points the individual pipes which have been welded together. By the fixing in the ground of the anchor block, which preferably consists of concrete, the steel pipe is fixed at this place since as a result of the profiling projections of the invention a firm attachment is present between steel pipe and anchor block.

In accordance with a variant, in order to fix the steel structural part provided with profiling projections in position, a piece of pipe provided with holding anchors surrounds said part, the pipe being provided on its inner side with a profiling which takes up axial forces and the annular space between the steel structural part and the piece of pipe being filled by a hardened filling composition. In this way the steel structural part, for instance a pipe, can also be fixed in place in the manner that the holding anchors are anchored, for instance, on a concrete foundation or fastened to a suitable structure. The piece of pipe is held in place by the holding anchors and in its turn is immovably connected by the hardened sealing material to the profiling sections. Displacement of the sealing composition is out of the question since it, on the one hand, engages into the profiling projections of the coating and, on the other hand, is held by the inside profiling of the piece of pipe.

As sealing composition use may be made, for instance, of concrete, although plastic is preferred.

As profiling for the inside of the piece of pipe there can be used a helical rib which is secured there, for instance a steel helical rib which is welded on, provided that the piece of pipe also consists of steel.

BRIEF DESCRIPTION OF THE DRAWINGS

With the above and other objects and advantages in view, the present invention will become more clearly understood in connection with the detailed description of preferred embodiments, when considered with the accompanying drawings, of which:

FIG. 4 is a perspective view of a steel pipe according to still another embodiment, FIG. 5 shows a portion of the pipe in longitudinal section, FIG. 6 diagrammatically shows the application of an extruded tape together with rib onto a steel tube, FIG. 11 is a view, partially in section, in which a pipe is fixed by means of a piece of pipe, powder or granulate particles being applied as profiling projections to the plastic coating of the pipe, and FIG. 12 is a view similar to FIG. 11, but with a helical rib provided as profiling projections.

DETAILED DESCRIPTION OF THE PREFFERRED EMBODIMENTS

Figure 1:
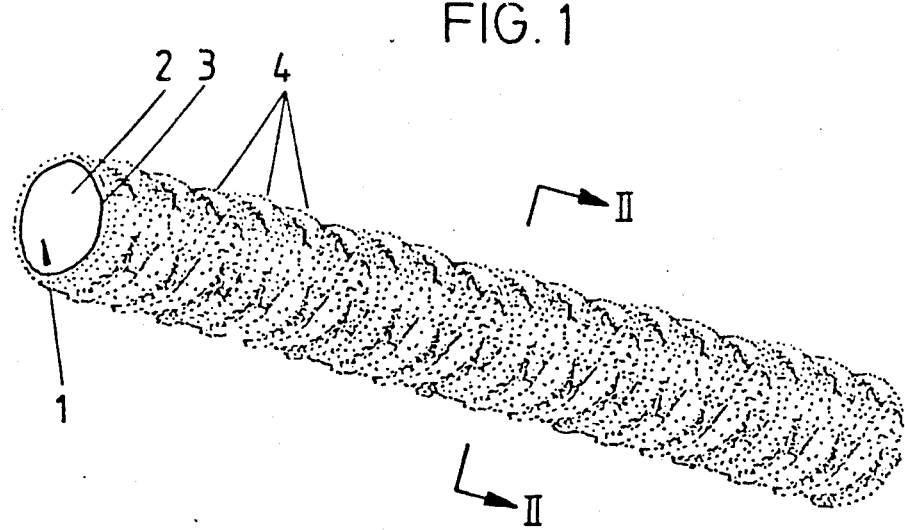
FIG. 1 shows a steel part provided with coating.

FIG. 1 shows a steel part 1 which is developed as a reinforcement bar 2. Its surface 3 has elevations 4 in order to obtain the firmest possible hold upon its embedment in concrete.

Figure 2:
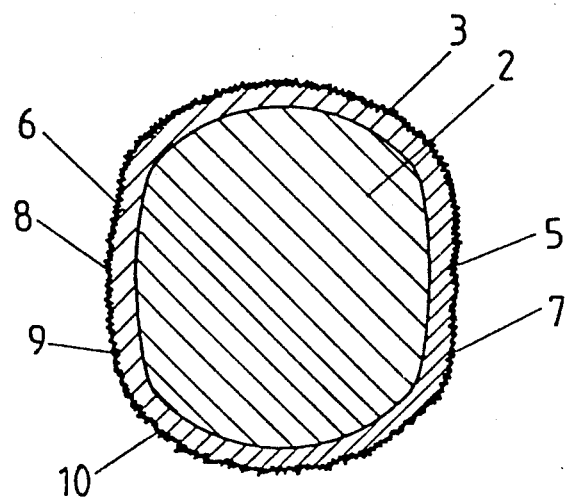
FIG. 2 is a cross section through the steel part along the line II—II of FIG. 1.

In accordance with FIG. 2, a plastic coating 5 is applied onto the surface of the reinforcement bar 2. The plastic coating 5 is a layer of polyethylene 6. On the surface 7 of the polyethylene layer 6 there is applied a powder 8 which forms a friction covering 9; i.e. the individual granules of the powder 8 form a rough surface structure. The powder 8 is preferably powdered polyethylene 10 which has been softened by heat treatment but has not been taken up entirely by the surface 7.

Figure 3:
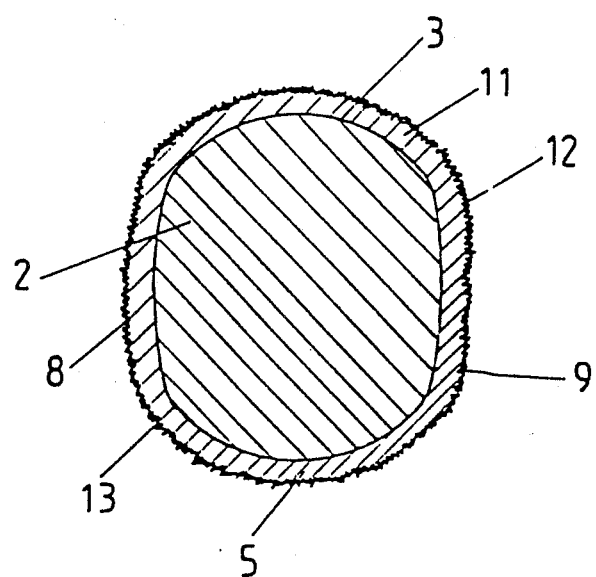
FIG. 3 is a cross section through the coated steel part in accordance with another embodiment of the invention.

FIG. 3 shows another embodiment of the invention, FIG. 3 also being a cross section through a reinforcement bar 2. There is the difference, however, from the embodiment described above and that of FIG. 2 in that as plastic coating 5, there is applied an epoxy resin layer 11 within the surface 12 of which the particles of powder 8 are partially included. As powder 8 there is preferably used a thermoset powder 13, preferably an epoxy powder.

Depending on the viscosity of the plastic coating at the time of the application of the powder, a deeper or shallower penetration of the particles can be obtained. Depending on the degree and depth of diffusion of the powder into the plastic coating, the roughness of the surface can be varied, for instance from a structure similar to an orange skin to a sharp-edged, large-area protrusion of the particles.

The pipe 101 developed as a pipeline pipe has, as shown in FIG. 4, an inner surface-treated steel pipe 102 representing a steel part 102. The treatment can, for instance, consist of a phosphating. Another component of the pipe 101 is an inner covering 103 of plastic which surrounds the steel pipe 102. For the covering 103 thermoplastic resins in particular are suitable. There is also an outer covering 104 of reinforced concrete.

In order to optimally develop the longitudinal displacement adherence between the covered steel pipe 102 and the concrete covering 104, there is provided, in accordance with the embodiment of FIG. 5, a helically extending rib 105 which protrudes from the inner covering 103. The side flanks 105' of the turns of the flat rib 105 represent profiling projections which extend into the concrete covering 104 and lead to a form-lock. The helically applied rib 105 extends from the outer surface 103' of the inner covering 103 and is firmly attached to it. The rib 105 also consists of thermoplastic material, which is selected harder than the material of the inner covering 103.

Figure 6:
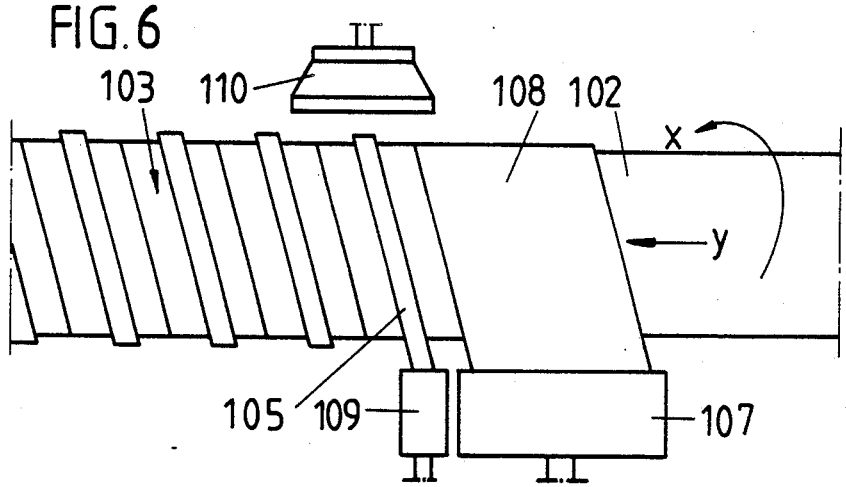

The coating of the surface-treated pipe 102 with the inner covering 103 can be noted from FIG. 6. A web 108 coming from an extruder nozzle 107 is wound onto the steel pipe 102 which has been provided with a thin layer of adhesive 106. The steel pipe 102 carries out in this connection a superimposed movement. In addition to rotation in the direction indicated by the arrow x, the pipe 102 is moved along the extruder nozzle 107 in the direction indicated by the arrow y. In this way, the extruded web 108 is wound onto the steel pipe 102 and forms the inner covering 103. During this application the pipe is heated to the required temperature.

An additional extruder nozzle 109 is arranged adjacent the extruder nozzle 107. This additional nozzle forms the rib 105 which is wound helically on the covering 103. This application of the rib 105 is effected at melting temperature in such a manner that no through-melting takes place. Since the application of the rib 105 takes place upstream, an infrared radiator 110 is installed facing the additional extruder nozzle 109 in order to obtain a sufficient melting temperature.

Figure 7:
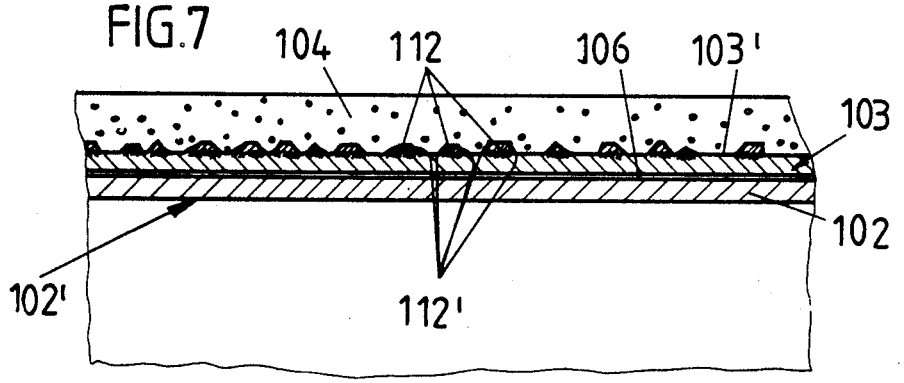
FIG. 7 shows a portion of the pipe in longitudinal section in accordance with an embodiment provided with powder or granulate bodies.
Figure 8:
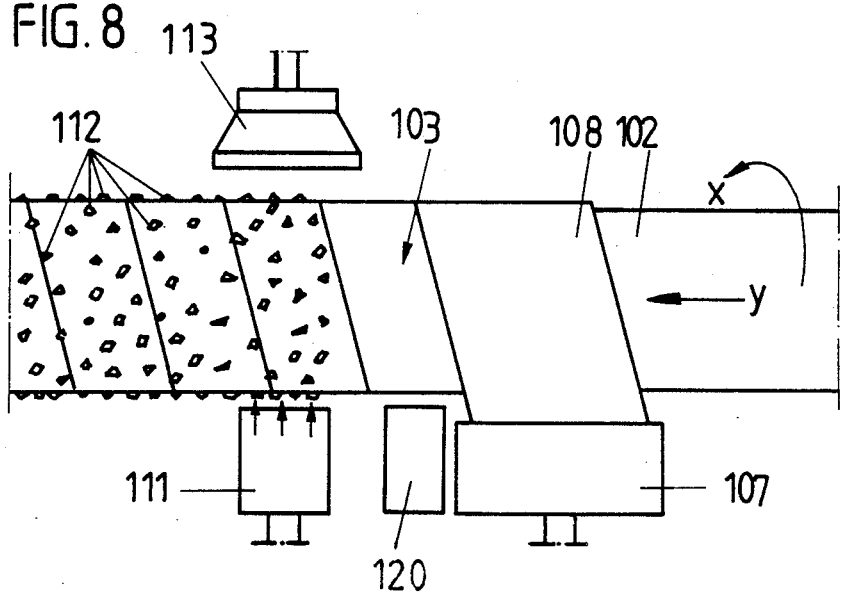
FIG. 8 shows, also diagrammatically, the application of the extruded tape to the pipe and of the powder granules or granulates to the tape.

The coating of the pipe provided with the inner covering 103 and the rib 105 can then take place in customary manner in a subsequent operation, the concrete entering into the spaces between the helical turns. The turns form steps which lie transverse to the longitudinal direction of the pipe and lead to great stability in axial direction of the position of the concrete jacket on the steel pipe 102. FIGS. 7 and 8 show the manufacture of the embodiment of a steel structural part developed as pipe. The inner covering 103 is applied in the same manner as previously in that a web 108 coming from the extruder nozzle 107 is wound onto the steel pipe 102 which carries out a superimposed movement.

Differing from the previous embodiment, a coating device 111 is arranged behind the extruder nozzle 107. This coating device contains preheated ground plastic powder 112 or granulates which are applied in suitable manner to the plastic covered pipe. Facing the coating device 111 there is also arranged an infrared radiator 113 which produces the required melting temperature. The granulates 112 become attached to the inner covering 103 without any melt-through effect, so that in this way profiling projections which protrude beyond the outer surface 103' of the covering 103 are formed; see in particular FIG. 7. The granulate profiling projections 112 form steps 112' which also extend transversely to the longitudinal direction of the pipe and lead to a form lock between concrete covering 104 and inner covering 103.

The powder granules or granulates may vary in size depending on the purpose of use and the size of the pipes. In this version also the granulates 112 may have a greater hardness than the inner covering 103.

It is advantageous if the plastic coating applied is cooled until the application of the helical rib and/or the plastic powder or granulates 112 in order to increase the structural strength of the plastic coating. A device for cooling the plastic coating is shown diagrammatically in FIG. 8, marked by the reference number 120. The cooling device 120 lies between the extruder nozzle 107 for the plastic coating and the coating device 111 for the application of the profiling projections. Such a cooling device can furthermore also be provided (not shown) in the embodiment of FIG. 6; it would then be arranged between the extruder nozzle 107 and the additional extruder nozzle 109. By the cooling of the plastic coating which has been applied under the action of heat, said coating acquires a structural strength so that shrinkage stresses due to cooling occurring after application of the helical rib can be taken up without the coating being damaged. As a result of the cooling, however, the surface temperature of the plastic coating is also reduced to such an extent that the following application of the profiling projections cannot take place without further heating. Here, however, heat sources (infrared radiator 110, infrared radiator 113) help out in the manner that they again melt merely the surface of the pipe coating to a depth of only a few μm so that an intimate bond to the corresponding profiling projections is created. The structural strength created by the cooling remains thereby substantially maintained. By means of the cooling, the depth of penetration of the powder bodies 112 or granulate granules can also be controlled in the embodiment shown in FIG. 8.

Figure 9:
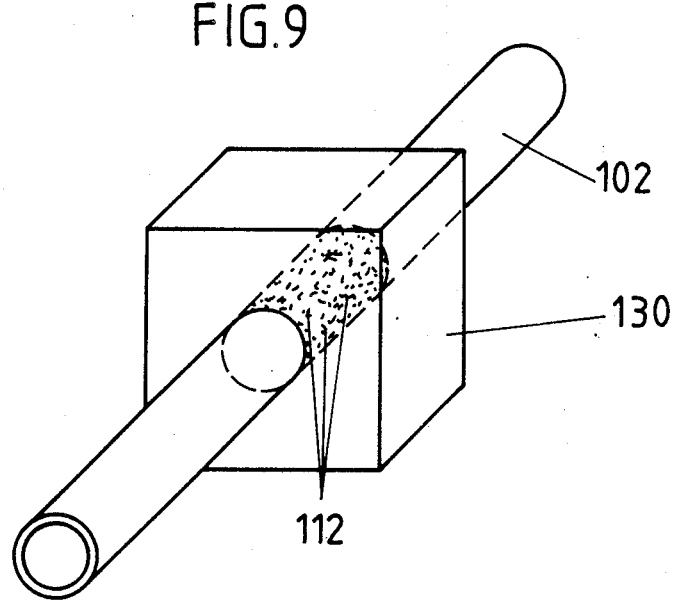
FIG. 9 is a perspective diagrammatic view of a steel part developed as pipe which is fastened by means of an anchoring block, the profiling projections being formed by powder or granulate particles.

In accordance with the invention, a steel part provided with plastic coating and profiling projections is to be fixed in position by means of the embedding material. This is shown in FIG. 9, in which the steel part is a plastic-coated pipe with powder or granulate particles fixed therein, as shown in FIG. 8. In this connection it may furthermore be mentioned that the plastic coating does not have to be produced by an extruder helix but rather it is also possible, as alternative, to extrude a tube which is applied over the steel pipe. In accordance with FIG. 9, the embedding material is not developed—as previously described—as pipes consisting preferably of concrete which surround the pipe, but it forms a parallelepiped block 130. This block 130 can preferably consist of concrete and extend only over a part of the length of the pipe. The covered pipe 102 has powder or granulate particles 102 on its plastic coating at least in the region of the block 130 so that an intimate connection is present between the block 130 and the plastic coating. The pipe 102 which passes through the block 130 is thus held immovable relative to the block 130. The block 130 can form an anchoring block if it is, for instance, buried in the ground or secured in some other manner. For example, it is possible in this way to create for pipelines fixed points which hold fast the pipe which expands upon heat and contracts upon cold.

Figure 10:
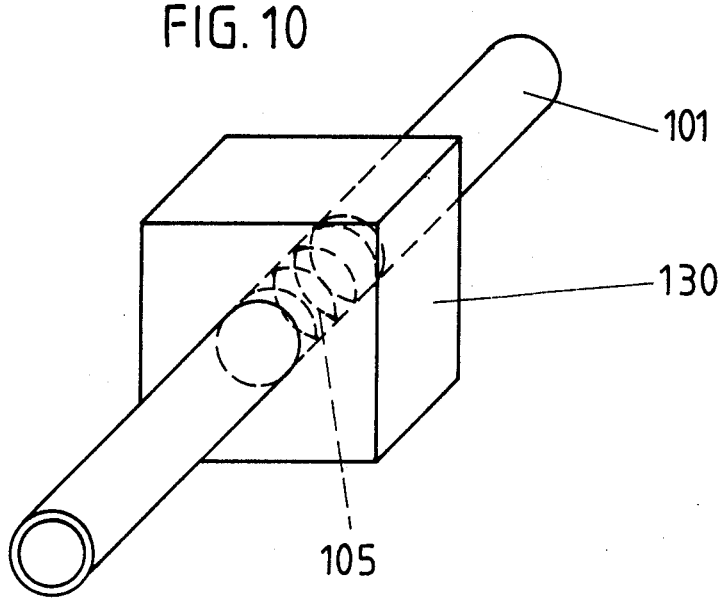
FIG. 10 is a showing similar to FIG. 9, the profiling projections being formed, however, by a helical rib.

FIG. 10 shows another embodiment, it differing from the one shown in FIG. 9 only by the fact that the pipe has profiling projections which are developed as a helical rib 105.

A further variant embodiment for the holding fast of the pipe can be noted from FIG. 11. The pipe 102 is surrounded coaxially in individual regions by a piece of pipe 131, an annular space 132 being created between pipe 102 and the piece of pipe 131. On the inside of the piece of pipe 131 there is developed a profiling 133 which can be developed as helical rib 134 attached to the inside of the piece of pipe 131. The helical rib 134 forms steps in the axial direction of the piece of pipe. The pipe 102 is coated with plastic and has profiling projections developed in accordance with FIG. 11 as powder or granulate particles 112 at least within the region of the piece of pipe 131. On the outer side of the piece of pipe 131 there are fastened holding anchors 135 which are embedded in a fixing material 136. The fixing material 136 can consist, for instance, of a concrete structural part which in its turn is held fast in the ground or the like. Furthermore, it is also possible to secure the holding anchors 135 on corresponding other structures. The annular space 132 is filled with a hardening grouting composition 137. In this way an intimate bond is obtained between the pipe 102 and the piece of pipe 131 since the grouting composition 137, before hardening, has passed between the profiling projections 112 and the profiling 133; and to this prevents axial displacement between pipe section 131 and pipe 102. The pipe section 131 is held in the fixing material 136 by the holding anchors 135. In this way there is thus obtained—in the same way as in FIGS. 9 and 10—a possibility for the fixing in place of the pipe 102.

FIG. 12 shows another embodiment, it differing from FIG. 11 only by the fact that the pipe is not provided with profiling projections of powder or granulate particles but has a helical rib 105 on its plastic coating.

As grouting composition 137 synthetic resin can preferably be employed. However, it is also possible to use concrete.

Finally, it should also be pointed out that for the applying of the annular rib 105 to the plastic coating of the pipe pressing rollers can be provided which press the helical rib firmly on the plastic surface and in this way assist in the holding fast of the helical rib.

All features mentioned in the specification and shown in the drawing are essential to the invention even if they have not been expressly included in the claims.

We claim:

1. A method of covering a steel part wherein, on an outer surface of the part, there has been applied a plastic coating which can be brought into or is in contact, at least in individual regions, with an embedding material, comprising the steps of:

under the action of heat, applying a plastic material consisting solely of a granular thermosetting plastic powder or granulate to the plastic coating to form an interface to the embedding material by an outer surface of the plastic coating with profiling projections, the plastic coating being a thermosetting plastic in a tacky partially hardened state during said applying step, the plastic coating allowing individual particles of the powder or granulate to protrude from the plastic coating to form the profiling projection, said projections consisting solely of said particles of powder or granulate; and hardening the plastic coating and the plastic material thereon to a fully hardened state.

2. A method according to claim 1, wherein the same material is used for the plastic coating and the powder.

3. A method according to claim 1, wherein the plastic coating is applied as a thermoplast layer, particularly a polyethylene layer; the method including a step of heating the plastic coating during application of the powder, the thermoplast layer being in a gelating state as a result of said heating.

4. A method according to claim 3, wherein the applied powder is a thermoplast powder, particularly a polyethylene powder.

5. A method according to claim 1, wherein the plastic coating comprises polyethylene and/or ethylene copolymer.

6. A method according to claim 1, wherein the powder comprises polyethylene and/or ethylene copolymer.

7. A method according to claim 1, wherein the plastic coating comprises an epoxy resin layer.

8. A method according to claim 1, wherein the powder is epoxy resin powder.

9. A method according to claim 1, wherein said step of applying the powder provides that the powder is blown, strewn or thrown onto the plastic coating.

10. A method according to claim 1, wherein said step of applying the powder is accomplished within an electrostatic field.

11. A method of covering steel parts, particularly pipes, comprising the steps of:
on an outer surface of a steel part, applying a thermosetting plastic coating;
heating the plastic coating and applying a helical rib onto the heated plastic coating to form profiling projections; and
wherein said rib consists of a thermosetting plastic.

12. A method according to claim 11, wherein immediately after application of the plastic coating, the helical rib is applied onto the coating;
the method including a step of directing a source of heat onto an outside of the coating and/or an attachment side of the helical rib to the coating in order to maintain a surface of the coating at a melting temperature.

13. A method according to claim 12, further comprising
a step of cooling the plastic coating until application of the helical rib in order to increase structural strength of the plastic coating.

14. A method according to claim 1, further comprising
forming the profiling projections and the plastic coating of different hardness.

15. A method according to claim 1, wherein the steel part comprises a pipe, and wherein the embedding material is for holding the pipe fixed in space.

16. A method according to claim 15, further comprising the step of
developing an outer structure connected to the pipe as an anchoring block for fixing the pipe in position in the ground.

17. A method according to claim 15, further comprising the steps of
fixing the steel part to a surrounding structure, wherein a section of pipe is arranged around the steel part, holding anchors extending outward of the pipe, said pipe being provided on its inner side with said profiling projections which take up axial forces, there being an annular space between the steel part and the pipe section which is filled with a hardened filling composition as the embedding material.

18. A method according to claim 17, wherein the filling composition is a plastic.

19. A method according to claim 17, wherein the profiling projections comprise a helical rib which is disposed on the inner side of the pipe section.

20. A method according to claim 18, wherein the profiling projections comprise a helical rib which is disposed on the inner side of the pipe section.

21. A method for anti-corrosion coating of a steel part comprising the steps of
forming an outer plastic coating of thermosetting material on the steel part such that the plastic coating is in a sticky condition and incompletely hardened, and
applying a powder consisting solely of a thermosetting granular powder, under action of heat, on the incompletely hardened plastic coating which is still in the sticky condition so as to produce surface roughness on the plastic coating by individual granules of the powder partially penetrating and bonding in the plastic coating and projecting therefrom.

22. The method according to claim 21, wherein the powder chemically bonds to the plastic coating.

23. A method of covering steel parts, particularly pipes, comprising the steps of:
on an outer surface of a steel part, applying a thermosetting plastic coating;
heating the plastic coating and applying a plastic material consisting solely of a thermosetting plastic powder or granulates onto the heated plastic coating to form profiling projections.

24. A method according to claim 23, wherein immediately after application of the plastic coating, the thermosetting plastic powder or granulates is applied onto the coating;
the method including a step of directing a source of heat onto an outside of the coating and/or an attachment side of the thermosetting plastic powder or granulates to the coating in order to maintain a surface of the coating at a melting temperature.

25. A method according to claim 24, further comprising
a step of cooling the plastic coating until application of the thermosetting plastic powder or granulates in order to increase structural strength of the plastic coating.

* * * * *